May 8, 1951 F. B. PFEIFFER 2,551,762
BIAS CUTTER

Filed July 12, 1947 3 Sheets-Sheet 1

INVENTOR:
FRED B. PFEIFFER
BY Jordon C. Mack
ATTORNEYS.

May 8, 1951 F. B. PFEIFFER 2,551,762
BIAS CUTTER
Filed July 12, 1947 3 Sheets-Sheet 2
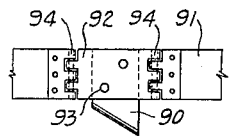
Fig.-9
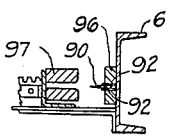
Fig.-11
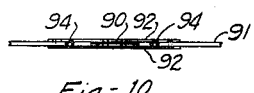
Fig.-10
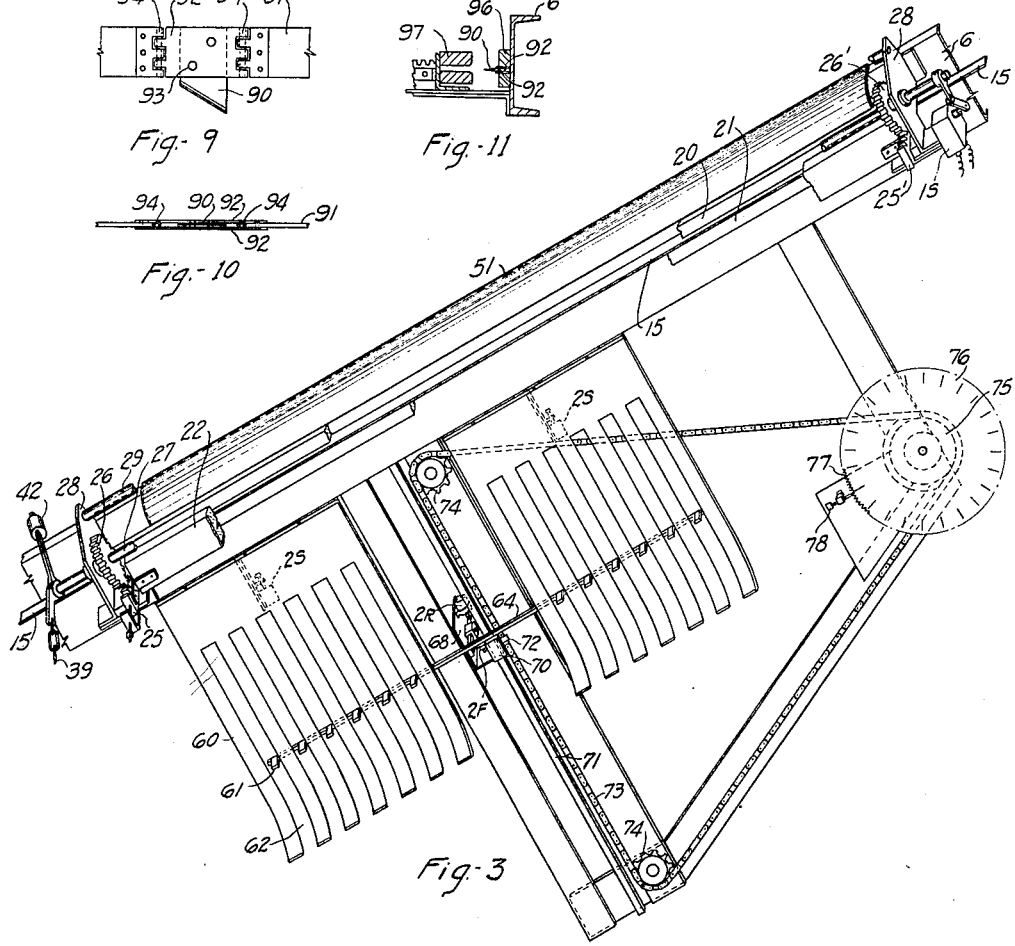
Fig.-3
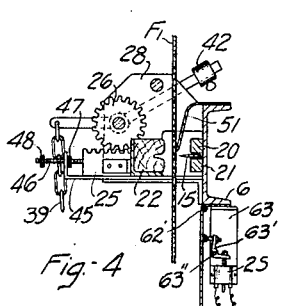
Fig.-4  Fig.-5
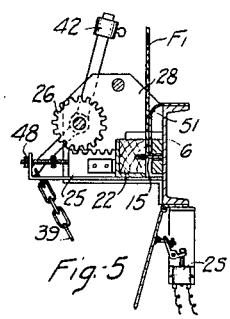
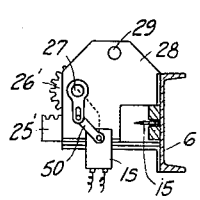
Fig.-6
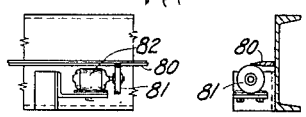
Fig.-7  Fig.-8  Fig.-8a
INVENTOR:
FRED B. PFEIFFER
BY Gordon C. Mack
ATTORNEYS.

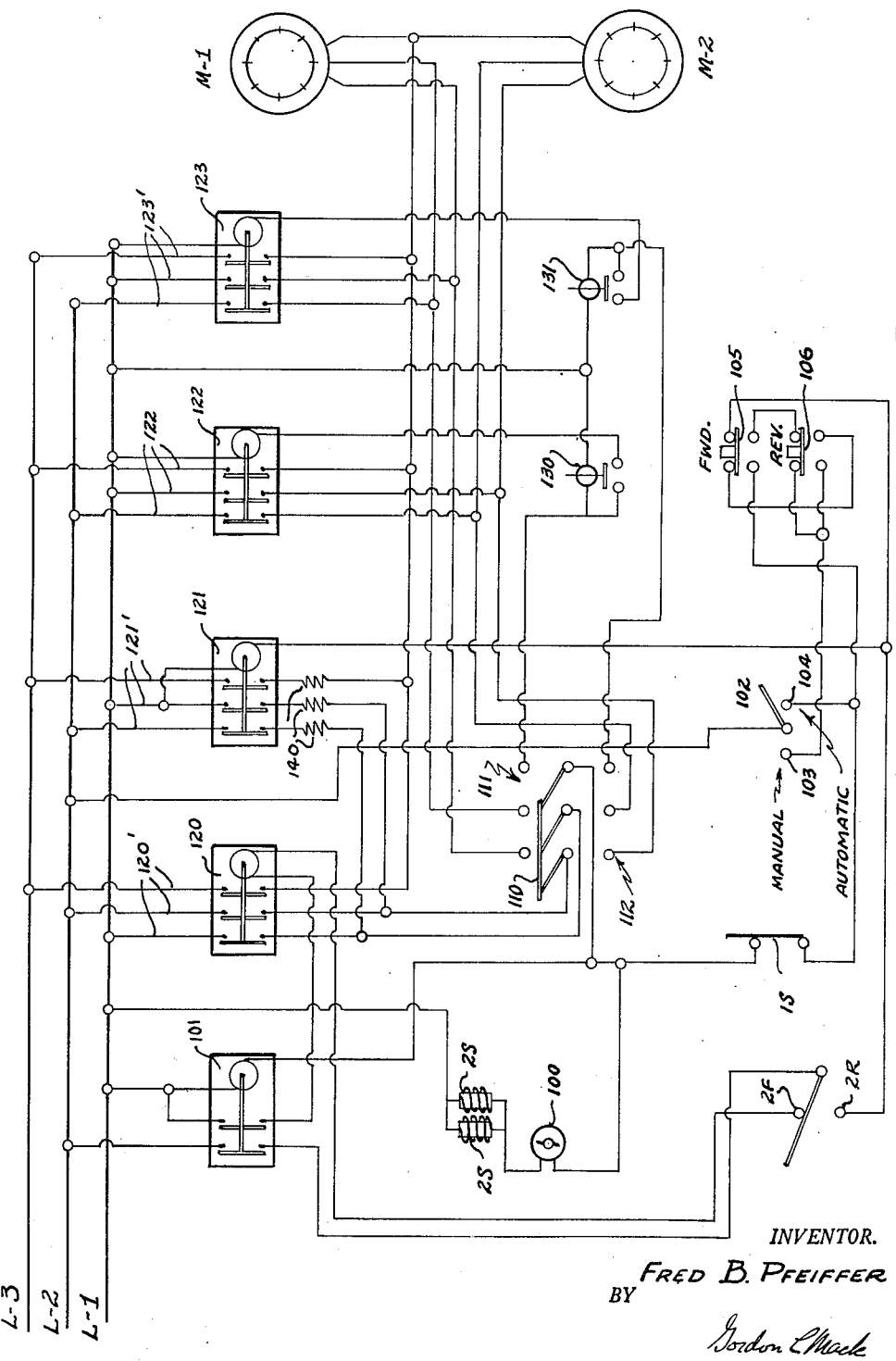

Patented May 8, 1951

2,551,762

UNITED STATES PATENT OFFICE 2,551,762

BIAS CUTTER

Fred B. Pfeiffer, Akron, Ohio, assignor to Seiberling Rubber Company, Barberton, Ohio, a corporation of Delaware Application July 12, 1947, Serial No. 760,629

1 Claim. (Cl. 164—35)

This invention relates to an improved bias cutter. Such machines are used widely in the rubber industry for cutting lengths of cord fabric on the bias. These lengths or plies are used in building pneumatic tires. The invention includes the new apparatus and, also, the new method of measuring and cutting and includes new assemblies and their operation as well as the whole machine and its operation.

The fabric, ordinarily cut on a bias cutter, is cord fabric which has been treated with rubber. Long lengths of such fabric are fed over a driven roll to the cutting mechanism. Plies of different lengths are required for different sized tires, etc., and the cutter of this invention is adapted to cut plies of any desired lengths. The measuring instrument which measures the length of each ply is located below the cutting knife, and the forward edge of the ply actuates it and causes the desired length to be accurately measured automatically.

The cutting instrument is preferably arranged to operate as a continuous band. It may be a knife blade or a saw or one or more individual cutting blades mounted on a continuous band support. It is preferably permanently located although adapted to swivel to cut at different angles, and the fabric is moved toward it and away from it before and after each cutting operation. The electric circuit which operates the measuring system is advantageously broken during the cutting operation.

In a preferred form of the invention the bias cutter is provided with means for feeding two or more different fabrics to the cutting mechanism at different times. These fabrics may be of different width or different gauge, etc. In this form of the invention, means is provided for measuring one or more lengths of one of the fabrics and cutting them on the bias and for then measuring one or more lengths of the second fabric and cutting them on the bias; and as the switch is made from one fabric to the other, the forward edge of the fabric which is not being measured and cut is automatically drawn back away from the cutting instrument. Plies of either fabric may be cut from time to time as required.

The invention will be further described in connection with the accompanying drawings, in which:

Fig. 3 is an enlarged detail of the measuring and cutting mechanism with parts broken away to more clearly show its construction and operation;

Figs. 4 and 5 are details illustrating how the fabric is pressed against the cutting instrument;

Fig. 6 is a detail of a switch arrangement;

Figs. 7 and 8 are top and sectional views of a knife-blade sharpener which may be used;

Fig. 8a illustrates a preferred cutting instrument;

Figs. 9–11 show alternative cutting means; and

Fig. 12 is an electrical diagram of the circuits used in operating the cutter.

Figure 1:
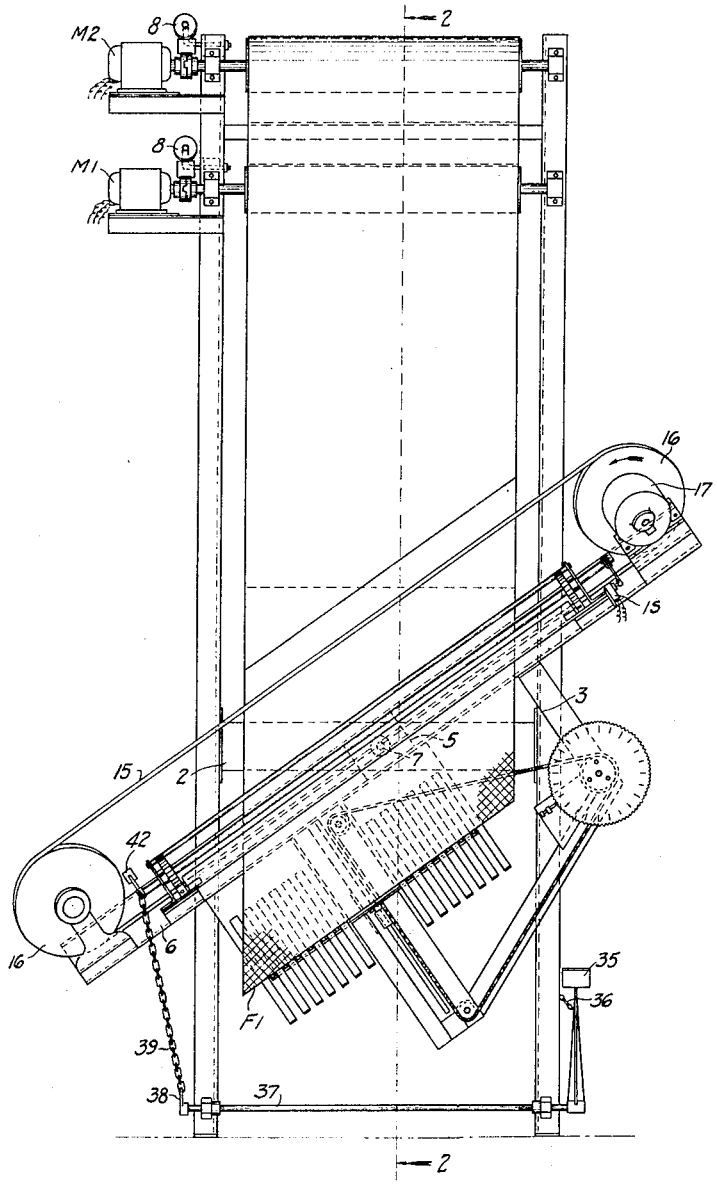
Fig. 1 is a front elevation of the bias cutter.

The bias cutter is mounted on a standard 1 and, more particularly, on the channel 2 which is fastened to the plates 3 at each side of the standard. The small plate 5 to which the channel 6 (which is the base plate of the cutting mechanism) is welded swivels about the bolt 7. By loosening and then tightening the nut on the bolt 7, the cutting mechanism may be set to cut the fabric at any desired angle.

Two different lengths of fabric F1 and F2 are separately fed to the cutting mechanism by the motors M1 and M2 which are operated independently of one another. As will be explained in connection with the wiring diagram, the equipment is connected so that when the switch is thrown to feed fabric F2 instead of F1, for example, M1 will reverse and draw the fabric F1 up away from the cutting edge before the front edge of the fabric F2 is moved downward past the cutting edge, and vice versa; and this will be done automatically. The brakes 7 weighted at 8 prevent the feed rolls for the fabric from turning except when driven by the motors M1 or M2. The shield 10 is simply sheet metal or the like which separates the fabrics and prevents them from rubbing against one another.

Figure 2:
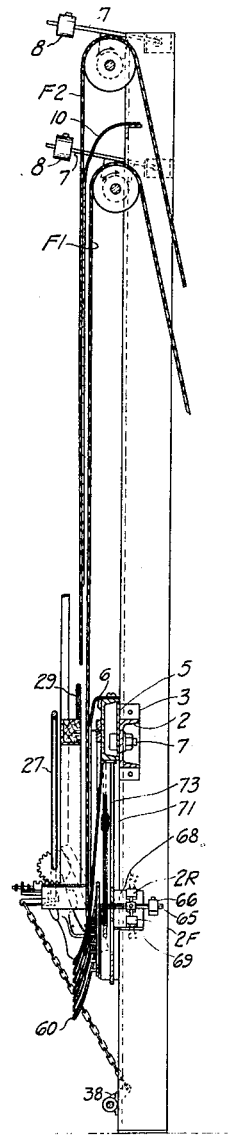
Fig. 2 is a section on the line 2—2 of Fig. 1.

Different types of cutting instruments may be employed. A preferred type is a knife blade, and this will be described first, and alternative arrangements will then be referred to. Figs. 4 and 5 show certain details of a knife-blade arrangement and illustrate its operation. Fig. 3, although showing more details than Figs. 1 and 2, is not complete. For instance, it shows only one stretch of the knife blade 15 and does not show the return stretch illustrated clearly in Fig. 1.

The back of the knife blade rests against channel 6 so that as pressure is applied against the blade, it does not give but remains perfectly straight and cuts in a straight line. The knife blade travels around the pulleys 16 (Fig. 1) and is driven by the motor 17 (Fig. 1). It is supported between the two blocks 20 and 21. The fabric is pressed against the knife blade by the slotted block 22, the slot being large enough to accommodate the sharpened edge of the knife blade but narrow enough to prevent the fabric from being pushed into it by the knife blade. Fig. 4 shows the block 22 and the fabric F1 before cutting, and Fig. 5 shows the same on completion of the cutting. The block 22 is fastened at its two ends to the racks 25 and 25'. These racks are in mesh with pinions 26 and 26'. The pinions are mounted on the shaft 27 and turn with it. This shaft passes through the end plates 28 which are supported on the channel 6 and spaced by the bar 29.

Fig. 1 shows the fabric F1 just after the completion of the cutting operation and before the removal of the length of fabric which has just been cut off. The plate 35 hangs forward from the bias cutter and is supported by the chain 36. Pressure against the plate 35 turns the rod 37 backward, and this lowers the arm 38 which is fastened to its other end. This movement pulls the chain 39 down. The chain 39 is fastened to an arm mounted at one end of the shaft 27, and pulling it turns the shaft 27 and the pinion 26 in a counterclockwise direction (Figs. 4 and 5). As the chain 39 is pulled, the counterweight 42 is lifted. Fig. 4 shows the relation of the parts before pulling the chain 39, and Fig. 5 shows how, when the chain is pulled, the rack 25 is moved toward the fabric, and the block 22 fastened to the end of it presses the fabric against the knife 15. It will be noted that the rack 25 slides on the right-angular brace 45. The threaded shaft 46 protrudes from the outer end of the rack 25, and the nut 47 limits the inward movement of the rack, and the nut 48 limits its outward movement.

Fig. 6 illustrates how the movement of the shaft 27 throws the switch handle 50 to operate the switch 1S. The purpose of the switch 1S will be described in detail below.

As the fabric F1 or F2 is lowered for cutting, it is guided by the curved guide plate 51 so that in its downward movement it does not contact the knife edge. When the correct amount of fabric has been fed past the knife, the operator presses the plate 35. This pulls the chain 39 which, in turn, causes the block 25 to press the fabric against the knife blade. This blade is moving at all times. When the cutting operation has been completed and the pressure against the plate 35 is released, the counterweight 42 will draw the block 22 away from the fabric, and the guide 51 will spring out as shown in Fig. 4, lifting the forward edge of the fabric free of the knife blade and keeping the fabric out of contact with the knife blade when it is again fed downwardly.

The forward edge of the fabric is advanced a predetermined distance beyond the knife. The fingers 60 form an apron hinged to the channel 6 which guides the fabric after it has passed below the knife. The length of each ply is measured by the forward edge of the fabric coming into contact with the switch arms 61. These arms 61 project through the openings 62 in the apron. As will be explained, the pressure applied to these arms by the forward edge of the fabric operates a microswitch which controls the movement of the fabric up or down in front of the knife. The switch 1S (previously mentioned) is in the circuit between the microswitch and the motors which control the movement of the fabric. When pressure is applied to the plate 35, the switch 1S is opened (as explained), and as long as this switch is opened, the fabric is motionless. It is while the switch 1S is open and the fabric feed is disconnected that the fingers 60 of the apron are thrown forward to clear the switch arms 61 so that when the knife completes a cut, the fabric which is cut off will slide down the apron.

The apron is hinged to the channel 6 by the spring hinge 62' which holds the apron out in the position shown in Fig. 5. Its movement is controlled by the solenoids 2S which are mounted on the plates 63, which are fastened to the channel 6. The bell cranks 63' pivot on the pins 63'' mounted perpendicularly on the plates 63. When the solenoids are actuated, they pull the bottom arms of the bell cranks down, and the apron is pulled back so that the fabric which is fed down past the knife will contact the switch arms 61. When switch 1S is opened the current stops flowing through the solenoids and the spring hinges 62' spring out carrying the apron with them so that the fabric then slides clear of the switch arms 61. After each cutting operation, as soon as the operator ceases pressing against the plate 35, the switch 1S is closed, and current immediately flows through the motor M1 or M2 and advances the cut edge of the fabric in front of the knife. The flow of current through the solenoids 2S will be established soon enough to allow the arms to project through the openings 62 in the apron and contact the advancing edge of the fabric.

The arms 61 are connected with the microswitch, as is best demonstrated in Fig. 2 of the drawings. The bar 64 (Fig. 3) which supports the arms is fastened to the forward end of the arm 65. The arm 65 is pivoted at a point forward of the contacts 2R and 2F of the microswitch. The counterweight 66 offsets the weight of the switch arms 61 and is slightly heavier than is necessary for this purpose. Thus, when nothing is resting on the arms 61, the rear end of the arm 65 is down, and the switch 2F is closed. When the circuit is closed, the fabric is fed forward until it touches the switch arms 61. When the fabric rests on these, the counterweight 66 is lifted, and the switch 2R is closed. This reverses the feed of the fabric until its forward end is lifted off of the switch arms 61. As the switch arms are brought to the neutral position—i. e., when the switches 2R and 2F are both open—the exact length of fabric desired has been measured off and is ready for cutting. If on the reverse movement the arms 61 are permitted to rise too high, the switch 2F is again closed. The amount of overrun, if any, will decrease on the completion of each cycle until finally the microswitch comes to rest in neutral.

The microswitches are in the circuit with the switch 1S. When the plate 35 is pressed back by the operator, the shaft 27 is rotated and the switch 1S is opened. Therefore, during the cutting operation, when the shaft 27 is rotated so that the block 22 presses the fabric against the knife blade, the microswitches and, hence, the motors M1 and M2 are inactive. There is no movement of the fabric. However, as soon as the cutting operation is completed and the plate 35 is allowed to move forward, the shaft 27 rotates in the reverse direction, and the switch 1S is closed. Thus, as the operator places the ply of fabric he has just cut in a book or otherwise disposes of it, the microswitches become active and measure off the correct length of fabric to be cut off as the next ply.

The microswitches are mounted on the plate 68 which also supports the arm 65, the bar 64, switch arms 61, and the counterweight 66. This plate 68 is supported through the bottom plate 69 which is welded to the block 70. This block 70 is slidably mounted on the rod 71. The projection 72 on the block 70 is welded to the chain 73 of the measuring device.

The chain 73 passes over the sprockets 74 and the larger sprocket 75 to which the graduated disk 76 is fastened. This disk is provided with teeth 7 around its perimeter. The spring-actuated finger 78 fits between the teeth and holds the disk and also the switch arms 61 and the microswitches at any desired level. The disk is calibrated to measure the distance between the cutting edge 15 and the switch arms 61. By turning the disk and setting the finger 78 at any predetermined figure, the arms 61 will be located a predetermined distance below the knife, and the plies cut from the roll of fabric will be of predetermined length. The length is easily varied by adjusting the position of the finger 78 with respect to the disk. Thus, the position of the switch arms 61 is varied to give plies of any required length. The whole measuring device is mounted to swivel with the knife so that the calibration on the disk 76 may be read directly regardless of the angle of the knife.

The cutting instrument 80, illustrated in Figs. 7 and 8, is a knife blade. Figs. 7 and 8 show a permanent sharpening wheel 81 which is driven by the motor 82, mounted in a position to continuously sharpen the knife blade. Alternatively, a knife with about six teeth per inch may be used. The forward edge 85 of each tooth is sharpened and makes an acute angle with the back edge 86 of the blade, as illustrated in Fig. 8a. The rear edge of each tooth may be perpendicular or slope backward. Thus, as the blade passes over the fabric, the angular blade pressing against the fabric as it cuts through it tends to hold the fabric against the block 22.

The alternative cutting instrument shown in Figs. 9-11 is not continuous. One or more individual steel blades 90 are fastened into the belt 91 which is continuous. This belt may replace the knife 15 shown in Fig. 1. The belt 91 and the two lengths 92 may be of canvas or leather of the grade ordinarily employed in the manufacture of belts. The knife blade 90 is held between the two plies 92 by one or more set screws 93. This section which contains the knife blade is fastened into the belt by ordinary belt fasteners at 94. Several such knife blades may be fastened into the same belt spaced at any desired intervals, but a single blade will give satisfactory results. Fig. 11 shows this type of cutting means mounted between blocks 96 and backed up by the channel 6. The block 97 is provided with a slot wide enough to accommodate the belt fasteners 94. When the knife is cutting, it is immaterial whether the knife starts cutting at one edge of the fabric or first contacts the fabric at a point between its two edges. After a complete revolution of the belt 91, the fabric is severed.

Other types of cutting means may be employed.

Fig. 12 is a wiring diagram which illustrates the electrical connections for operating the bias cutter. The three lead wires marked L1, L2 and L3 supply the power to operate the various circuits. The switch with terminals marked 2F and 2R is the micro-switch operated by the arms 61 which project through the fingers 60 of the apron. The switch 1S is operated by the shaft 27 in the manner shown in Fig. 6.

One purpose of designing the bias cutter so that two different strips of fabric may be fed to the cutting knife is so that production is not slowed down when one fabric strip is used up. While an operator is cutting from one fabric strip the other may be positioned in the machine without interrupting production. The operator may cut from either fabric F1 or F2 by simply changing the position of the switch 110. If the switch 110 is engaged with the terminals 111, motor M1 is operated and fabric F1 is fed across the knife. Alternatively, if the switch 110 is engaged with the terminals 112, then motor M2 will be operated to feed fabric F2 across the cutting knife. The operator may switch from one fabric to the other as often as he wishes and to accomplish this all he needs to do is to change the position of switch 110.

The amount of fabric fed across the knife may be controlled either manually or automatically by switch 102. If the switch 102 is engaged with terminal 103 movement of the fabric may be manually controlled by the push buttons 105 and 106. These push buttons are used advantageously when the fabric is being aligned in the machine before production is to begin. Push button 105 is the forward button and controls the movement of the fabric toward the knife, and push button 106 is the reverse button and controls the movement of the fabric away from the knife.

Once the machine is properly set up for production the operator may then shift switch 102 over to terminal 104 and there the machine operates automatically. The operator may shift from one fabric strip to the other by means of switch 110 regardless of whether the machine is being operated by the automatic circuits or by the push buttons.

*The automatic operation*

The wiring diagram is more clearly understood by an explanation of the automatic operation. The initial portion of the following explanation assumes that switch 110 is engaged with terminals 111 so that motor M1 will be energized and fabric F1 is fed toward the knife to be cut.

When switch 102 is engaged with terminal 104 a circuit is closed which includes the solenoids 2S which pull the apron backwardly so that the fingers 61 are exposed to receive the lower edge of a fabric strip. The rheostat 109 is provided in the circuit with the solenoids to adjust the current to the solenoids from time to time if it is desired to change their strength.

Also energized at this position of switch 102 is a circuit which includes the switch 1S and the coil of switch 101 which is a two-pole, magnetic relay. When the coil is energized, the contacts of switch 101 are closed to form a circuit which includes the power supply lines L1 and L2, the terminal 2F and the coil of relay 120. Relay 120 (as well as 121, 122 and 123) is a three-pole Cutler-Hammer automatic-magnetic motor starter. As soon as the coil of relay 120 is energized the contacts of this relay are closed to establish a current flow along the leads 120' through the relay.

The right hand lead 120' (connected to L3) extends from the relay 120 directly to motor M1 and also motor M2. The other leads 120' from L1 and L2 respectively are connected to two poles of switch 110. Current through these leads is transferred across switch 110 to terminals 111 and from there conducted to the motor M1 to operate it in a direction to feed fabric F1 downwardly across the knife blade.

The third pole of switch 110 is energized by a branch lead from the circuit which includes the switch 102 and the switch 1S. Its corresponding terminal 111 is connected to the timer 130 which is connected to the coil of relay 122. When the motor M1 first begins to operate to lower fabric F1, timer 130 energizes the coil of relay 122. This closes the terminals of the relay and feeds current from the supply lines to the motor M2. The connections of these relays to the supply lines are such as to operate motor M2 in a direction to raise the fabric F2 away from the knife.

This movement of motor M2 occurs substantially simultaneously with the initial movement of motor M1. The lower edge of fabric F2 is raised to a position where it is away from the cutting knife and therefore the timer 130 is set to operate M2 for a relatively short time. As soon as the fabric F2 has been raised a sufficient distance away from the knife, timer 130 breaks the circuit to the coil of relay 122 to open relay 122 and motor M2 is then stopped. The timer 130 operates motor M2 only when the operator is making the first cut from fabric F1 after he has changed the position of switch 110. For succeeding cuts from fabric F1 there will be no movement of fabric F2 since none is needed. Each time the operator changes the position of switch 110, the timer 130 is reset.

The motor M1 feeds the fabric downwardly in front of the knife until the lower edge of the fabric contacts the arms 61 projecting through the fingers 60 of the apron. Prior to the time that the fabric reaches the arm 61 the switch operated by these arms will be engaged with terminal 2F as shown in the lower left corner in Fig. 12. The weight of the fabric on the arm 61 swings the switch away from terminal 2F and into contact with terminal 2R so that the circuit to the coil of relay 120 is broken and relay 120 is opened. This stops motor M1. When terminal switch 2R is engaged, a circuit which includes the switch 101 and the relay 121 is made. This circuit energizes the coil of relay 121 to close this relay and current is fed through the relay 121 to the terminals of switch 110. Relay 120 is disconnected from the switch 110 at this point in the cycle.

The leads connecting relay 121 to the power lines are attached to the power lines in such a manner that current may be supplied to the motor M1 at a different polarity from the manner in which it was supplied by relay 120. The result of this is that motor M1 is operated in a reverse direction and fabric F1 is then moved upwardly away from the arms 61.

As soon as the fabric edge is removed from the arms 61 the switch is moved away from terminal 2R and back to 2F. This breaks the circuit to relay 121 and re-energizes the circuit to relay 120 so that M1 is again driven forwardly to lower the fabric. By successively reversing M1 in this manner to raise and lower the fabric, its lower edge is eventually brought to a position where the switch which swings between 2F and 2R is held in a neutral position where it contacts neither 2F nor 2R. This breaks the pilot circuit through the switch 101 and the motor M1 is stopped. The operator then presses against the member 35 to cut the fabric and this opens switch 1S in the manner shown in Fig. 6 and in the manner described in the foregoing.

As the fabric is initially moved downward toward the knife, motor M1 operates rapidly. The fabric strikes the arms 61 with considerable force and a longer piece of fabric than is desired is fed across the knife. The fabric must then be raised and lowered again in the manner of the preceding paragraph until the switch between terminals 2F and 2R is opened so that the desired length of fabric is measured. The fabric is more quickly brought to its proper position for cutting if the fabric is raised at a slower rate than it is lowered. Therefore the resistors 140 are provided in the leads connecting relay 121 to motor M1 so that motor M1 operates much slower when raising the fabric than when it is lowering the fabric.

If, after making several cuts from fabric F1, the operator decides to cut from fabric F2 he merely throws switch 110 into contact with terminals 112 and he may do this without disrupting the automatic operation or changing the switch 102. Current is then fed through relay 120 to switch 110 in the manner described above and then through the terminals 112 into the leads which operate motor M2. In this position of switch 110, motor M2 operates to lower fabric F2 and timer 131 is energized by a lead from one of the terminals 112. This timer operates the coil of relay 123 which then closes relay 123 to operate M1 in a direction to raise fabric F1 away from the knife. After fabric F1 is raised a certain amount, timer 131 cuts relay 123 out of the circuit and stops motor M1.

Motor M2 lowers fabric F2 into contact with the arms 61 and a length of fabric F2 is measured in exactly the same manner that the fabric F1 was measured.

To summarize the function of the relays, it will be noted that relay 120 controls the forward movement of motor M1 when switch 110 is engaged with terminals 111. Relay 120 also controls the forward movement of motor M2 to lower fabric F2 when switch 110 is engaged with terminals 112.

Relay 121 reverses the operation of motor M1 or M2 depending on the position of switch 110 when the measuring switch is shifted from terminal 2F to 2R.

When switch 110 is changing the materials 111 to terminals 112, timer 131 energizes relay 123 to operate motor M1 to raise the fabric away from the knife.

When switch 110 is changed from terminals 112 to 111, timer 130 energizes relay 122 to operate motor M2 in a direction to raise fabric F2 away from the knife blade.

*The manual operation*

The equipment may be operated manually by the push buttons 105 and 106 by throwing switch 102 into contact with terminal 103. Switch 105 is in series with the circuit through switch 102 and switch 1S and the coil of switch 101. When push button 105 is pushed downwardly the switch 101 is energized to operate relay 120 in the same manner in which the device operates when it is on automatic operation. Either motor M1 or M2 is operated depending on the position of switch 110.

Push button 106 is in series with relay 121 and this button may be closed on the two terminals immediately below it to energize relay 121 and operate the motor connected by switch 110 and a reverse direction, that is, the direction to raise the fabric. When the reverse button is pressed, only relay 121 is energized.

Although the construction and operations have been described more particularly as applied to a bias cutter, it will be understood that the invention is not limited thereto, but has a broader scope, and includes other cutting operations. The invention is not limited to the details of the construction or operation more particularly disclosed, but is defined in the appended claim.

What I claim is:

A fabric cutter which has a cutting instrument, two motors each connected with means for moving separate pieces of fabric before the cutting instrument, means for measuring off a predetermined length of fabric, and means for connecting said measuring means with either motor to measure off a predetermined length of either fabric, and connected with the last-mentioned means means for reversing the first motor and advancing the second when said last-mentioned means is disconnected from the first motor and connected to the second.

FRED B. PFEIFFER.

REFERENCES CITED

The following references are of record in the file of this patent:

UNITED STATES PATENTS

| Number | Name | Date |
| --- | --- | --- |
| 734,215 | Bilgram | July 21, 1903 |
| 1,367,513 | Mann | Feb. 1, 1921 |
| 1,497,765 | Abbott | June 17, 1924 |
| 1,617,012 | Denmire | Feb. 8, 1927 |
| 1,731,713 | Denmire | Oct. 15, 1929 |
| 1,784,556 | Townsend et al. | Dec. 9, 1930 |
| 1,819,046 | Sullivan | Aug. 18, 1931 |
| 1,819,773 | Denmire | Aug. 18, 1931 |
| 1,895,274 | Alexander et al. | Jan. 24, 1933 |
| 2,117,057 | Evans | May 10, 1938 |
| 2,331,342 | Perry | Oct. 12, 1943 |